(12) United States Patent
Chou

(10) Patent No.: US 7,140,998 B2
(45) Date of Patent: Nov. 28, 2006

(54) DEVICE OF AN IMPROVEMENT ON THE STRUCTURE OF LINEAR ACTUATOR

(75) Inventor: Chien-Chih Chou, Taipei (TW)

(73) Assignee: Gear Driving System Co., Ltd., Taipei County (TW)

( * ) Notice: Subject to any disclaimer, the term of this patent is extended or adjusted under 35 U.S.C. 154(b) by 208 days.

(21) Appl. No.: 10/964,751

(22) Filed: Oct. 15, 2004

(65) Prior Publication Data

US 2006/0084544 A1   Apr. 20, 2006

(51) Int. Cl.
*F16H 57/08* (2006.01)
*H02K 7/10* (2006.01)
*H02K 7/18* (2006.01)
*H02K 41/00* (2006.01)

(52) U.S. Cl. .................. 475/331; 310/12; 290/1 C
(58) Field of Classification Search ............... 475/331; 74/89, 89.23; 310/12; 290/1 C
See application file for complete search history.

(56) References Cited

U.S. PATENT DOCUMENTS

| | | | | |
|---|---|---|---|---|
| 3,134,275 A | * | 5/1964 | Davison | ............... 475/323 |
| 4,512,116 A | * | 4/1985 | Vanderwal et al. | ......... 451/479 |
| 6,412,610 B1 | * | 7/2002 | Drennen et al. | ............ 188/156 |

* cited by examiner

*Primary Examiner*—Tisha Lewis
(74) *Attorney, Agent, or Firm*—Birch, Stewart, Kolasch & Birch, LLP.

(57) ABSTRACT

A device of an improvement on the structure of linear actuator primarily includes a motor body and an output shaft, and at one end of the motor body fixed a gear case in which two sets of planetary gear trains fitted, by which a sun gear of one of the planetary gear trains is disposed at the top of output shaft; according to the above mentioned structure, the mesh teeth number between planetary gear is more to enhance the efficiency of resisting shocks and absorbing vibrates for attaining the intention of reducing cost, decreasing weight, diminishing volume, and promoting better outlook.

1 Claim, 4 Drawing Sheets

DEVICE OF AN IMPROVEMENT ON THE STRUCTURE OF LINEAR ACTUATOR

FIELD OF THE INVENTION

The present invention relates to an improvement on the structure of linear actuator, more particularly, to an improvement on the structure of linear actuator to gain the effect of weight decreasing, volume shrinkage, and cost reducing.

BACKGROUND OF THE INVENTION

Conventional linear actuator fixes a threaded pole in front end of the motor, and an escalating threaded nut, mounted on the outside edge of the threaded pole, moves in axial direction while the threaded pole rotates diametrically; whereas the rotating speed of conventional motor is extremely fast, so that linear actuator fixed a set of gear slow-down device between output shaft and threaded pole to buffer the rotating speed of the threaded pole.

Figure 4:
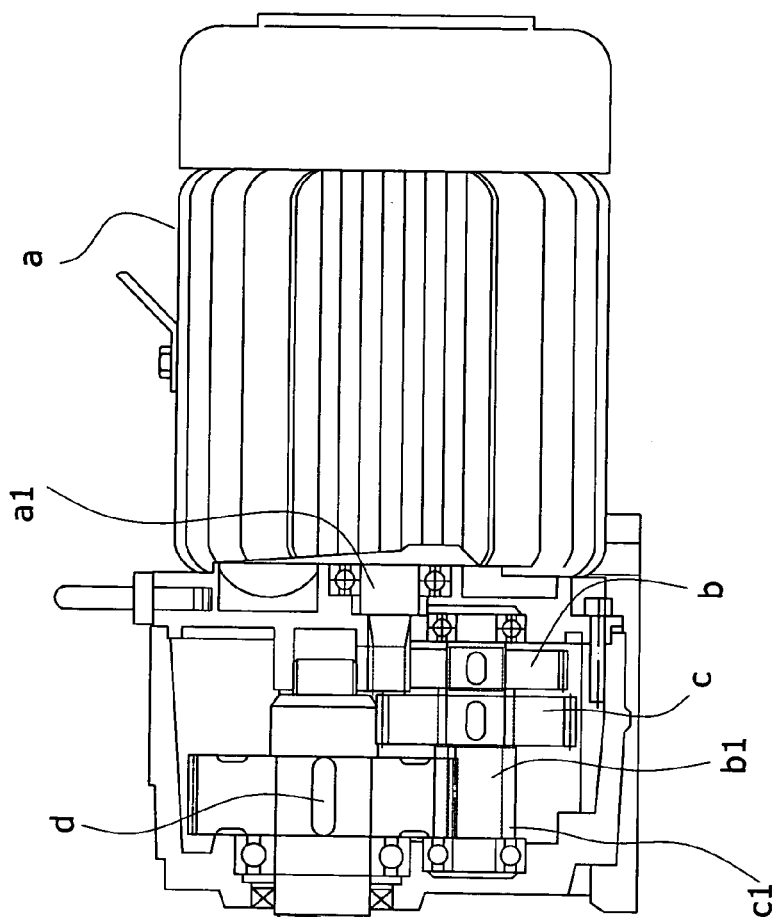
Figure 5:
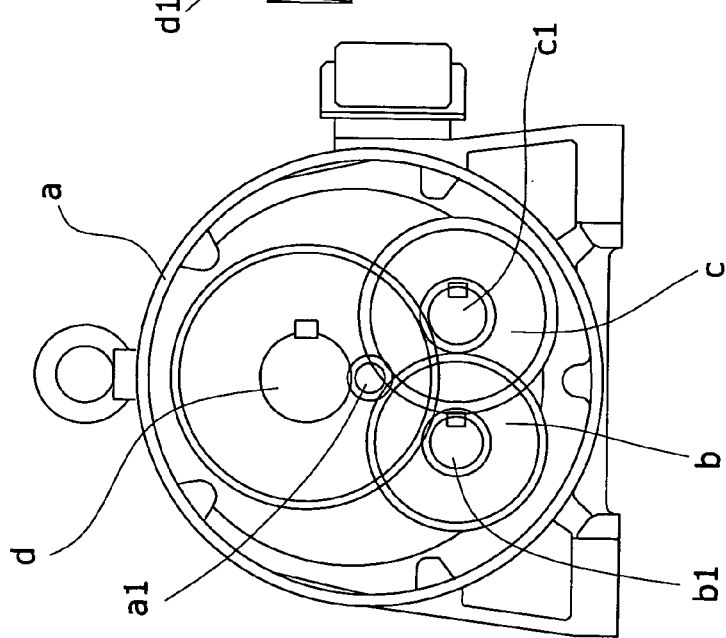

Refer to FIG. 4 and FIG. 5, conventional linear actuator primarily comprises a motor body a and an output shaft a1 which mesh with first big decelerating gear b in the edge of front side; whereas the first big decelerating gear b is disposed under one side of output shaft a1, and in the front center of big decelerating gear b fixes a first small decelerating gear b1 which meshes with second big decelerating gear c; whereas the second big decelerating gear c is disposed under the other side of output shaft a1 beside the first big decelerating gear b, and in the center of second big decelerating gear fixes a second small decelerating gear c1 which meshes with the third big decelerating gear d; In front end of shaft center of the third big decelerating gear d fixes a threaded pole d1 with an escalating threaded nut d2 mounted on.

As mentioned above, the output shaft a1 of conventional linear actuator drives the first big decelerating gear b to rotate, and rolls the first small decelerating gear b1 simultaneously, and therefore takes advantage of the mechanic functionality of the number of the teethes of output shaft a1 less than that of the first big decelerating gear d to gain the purpose of slowing down the speed; similarly, the mesh between first small decelerating gear b1 and the second big decelerating gear c, and the second small decelerating gear c1 together with third big decelerating gear d are also designed to meet the purpose of slowing down the rotating speed.

Accordingly, the mesh point between gears of conventional linear actuator only in one part makes the actuation strength concentrate on one or two gears. In order to prevent concentrating strength from causing collapse, usage of better enduring material quality and weight and volume emphasis will increase the manufacturing cost and weaken the market competition.

SUMMARY OF THE INVENTION

It is therefore a primary object of the present invention to provide a newly device of improvement on the structure of linear actuator.

It is the further object of the present invention to provide a kind of motor, which can attain the purpose of reducing cost, decreasing weight and shrinking volume.

The present invention provides a device of improvement on the structure of linear actuator, primarily includes a motor body, an output shaft, and a motor case, wherein the improvement is characterized by: the inner side of motor case arranged four bolt grooves and four long bolts, and at one end of top motor cover with gear case at outer side in which contains a ring gear, a top planetary gear train, and a bottom planetary gear train; whereas the sun gear of bottom planetary gear train mounted on the top of output shaft, and at the top of the small gear bearing of bottom planetary gear train fixed a bearing gear, besides, on the top of the outer gear case arranged a top cover with a power cord hole and stationary casing at one side to manage multiple extendable power cords.

In addition, the present invention of an improvement on the structure of linear actuator possessed more teeth on planetary gear train and therefore has better strength to resist shocks and vibrations. Consequently manufactured by high quality material is not necessary so as to reduce material cost; the transmission ratio can be changed by changing the sun gear of the output shaft, moreover the long bolt located in the bolt groove of motor case, power cords hide in the top cover makes no power cords and bolts sling outside to enjoy the cost reducing, weight decreasing, and volume shrinkage, and get a better feature.

DETAILED DESCRIPTION OF THE PREFERRED EMBODIMENTS

Embodiments of the present invention will be described herein below by reference to the accompanying drawings and an adequate practical example: First of all, referring to FIG. 1,2,3, the improvement on the structure of linear actuator in accordance with the present invention primarily comprise a motor body 1, output shaft 11 and motor case 12, wherein the improvement is characterized as follows:

The inner side of motor case 12 arranged four bolt grooves 121 and four long bolts insert into the four grooves respectively, and at one end of the linear actuator fixed a top motor cover 14 with gear case 20 and four nuts 15 opposite to the four long bolts 13 respectively outside of the top motor cover, whereas the four long bolts 13 together with nuts 15 fasten on the top motor cover 14 and gear case 20 stationary to one end of motor case 12.

Furthermore, in the inner side of gear case 20 arranged with a ring gear 21, a top planetary gear train 22 and a bottom planetary gear train 23, at the top center of the gear case 20 set up a gear case hole 201; and within the inner of the top planetary gear train 22 and bottom gear train 23 fitted at least two planetary gears 220,230, on top of which arranged a small gear bearing 221,231, and a sun gear 222 ,232 set up among the planetary gears 220,230 respectively, the sun gear 232 of bottom planetary gear train 23 mounted on top of the output shaft 11, wherein the sun gear 222 of top planetary gear 22 mounted on top of the small gear bearing 231 of bottom planetary gear train 23. At the top of small gear bearing 221 of top planetary gear train 22 fixes a bearing gear 223, a top cover 30 fitted outside of gear case 20.

A top cover hole 301 arranges in the center of top cover 30, the threaded pole 4 insert through the inner side of gear case hole 201 as well as top cover hole 301, the bottom end of the threaded pole 4 connected with bearing gear 223, on one side of the top cover 30 arranged a power cord hole 31;

At one side of bearing gear 223 set up a side gear 24 with a side threaded pole 25 on top of the side gear 24;

At the inner side of power cord hole 31 fixes a stationary casing 310 to hold a plurality of extended power cords 16.

As shown above, refer to the present invention of a device of an improvement on the structure of linear actuator, wherein the outer edge of the threaded pole 4 fixes an escalating nut which could be moved back and forth along the threaded pole 4 by the rotation of the threaded pole 4 when rolls the output shaft 11 by means of the sun gear 232, top planetary gear train 22 and bottom planetary gear train 23 to transmit the power to roll the threaded pole 4; in addition, planetary gear drive by sun gear, and fixed ring gear, then output by small gear bearing to attain the purpose of speed deceleration; the deceleration method of the present invention of an improvement on the structure of linear actuator is driven by using sun gear 232 of bottom planetary gear 23 as active wheel to actuate planetary gear 230, and fixed the ring gear to match sun gear 222 of small gear bearing 231 as output terminal to drive top planetary gear 22 and transmit actuation to threaded pole 4 by means of the bearing gear 223 at top of small gear bearing 221. Owning to the fact that present invention has two sets of planetary gear, the rotating speed of the output shaft 11 decelerate twice before transmitting to threaded pole 4 so as to efficiently slow down the rotating speed of threaded pole 4.

As mentioned above, refer to the present invention of a device of an improvement on the structure of linear actuator, wherein if those two sets of planetary gear train contains two planetary gears respectively; in the planetary gear train, both the sun gear 222,232 together with planetary gear 220,230, and planetary gear 220,230 together with ring gear 21 has two mesh points; similarly, if the planetary gear contains three planetary gear 220,230, then mesh points increase into three, the mesh teeth increase because of more mesh points, and therefore enhance the ability of shock and vibration resistance without usage of high degree of material so that more optional choice of materials could be considered to compact the gear size and design a quite compact gear to meet the purpose of reducing material cost and condense gear size.

Furthermore, refer to the present invention of a device of an improvement on the structure of linear actuator, wherein side threaded pole 25 could be connected with a VR (variable resistant), and rotated simultaneously with side gear 24 by the driven of bearing gear 223, and sensed rotating times and position by means of the VR control mechanism to attain the effect of detect and control the shifting position of escalating threaded nut.

Moreover, refer to the present invention of a device of an improvement on the structure of linear actuator, wherein the sun gear 232 of motor output shaft 11 can be changed to alter the transmission ratio of top planetary gear train 22 and bottom planetary gear train 23 to gain the required effect of adjusting the shifting speed of escalating threaded nut; furthermore, because of the long bolts 13 located inside the bolt grooves of motor case 12 and power cords hided in the top cover 30, a better outlook happens by handling the outlook influence able factors of long bolts 13 and power cords 16.

In summary, the present invention of "a device of improvement on the structure of linear actuator" could actually reduce cost, decrease weight, diminish volume, and promote the effect of better outlook to possess the characteristics of practicality and progress.

Accordingly, to promote the progress in science and the useful arts, the invention is disclosed and is intended to be limited only by scope of the appended claim.

BRIEF DESCRIPTION OF THE DIAGRAM

Figure 1:
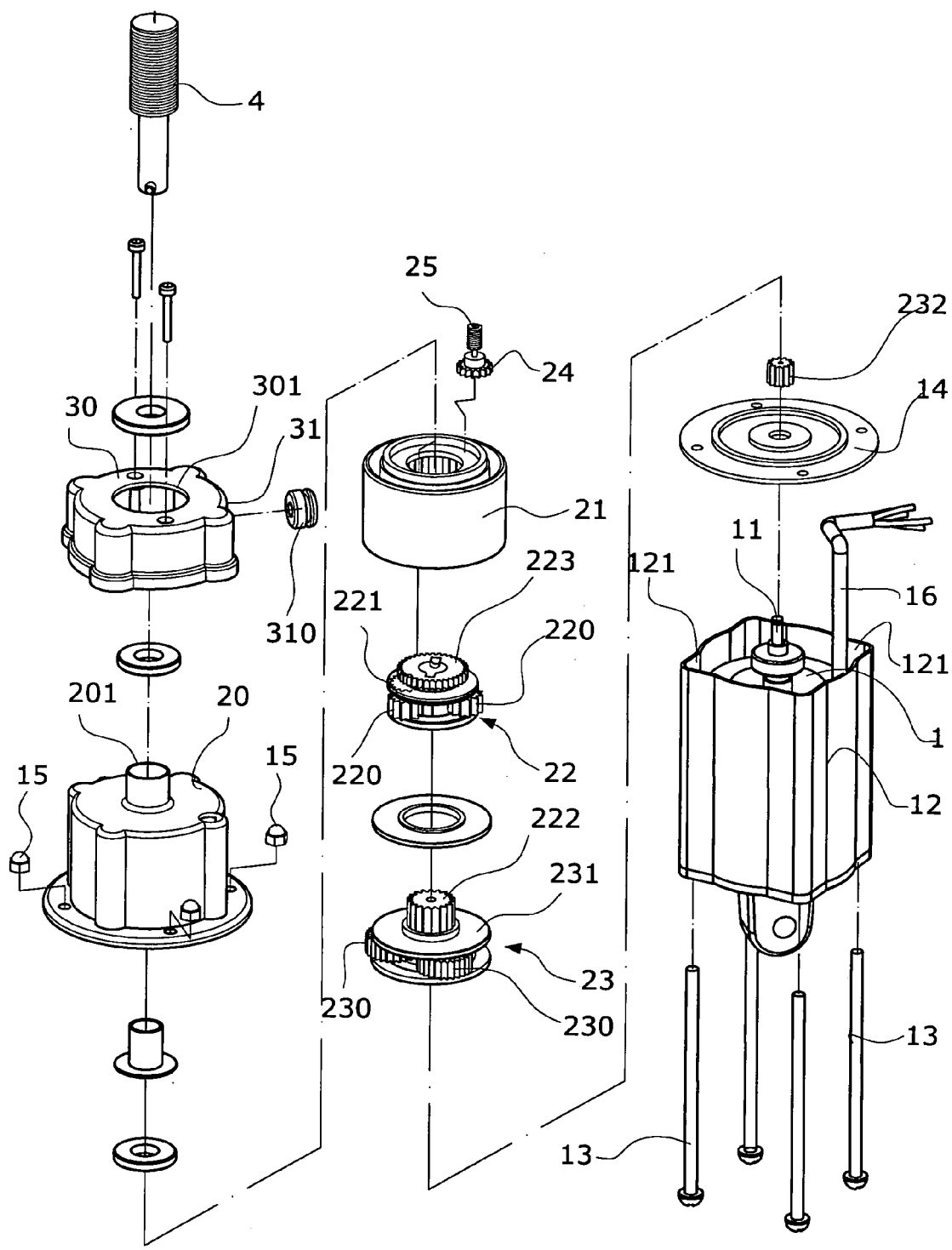

FIG. 1 the exploded perspective view of the present invention.

Figure 2:
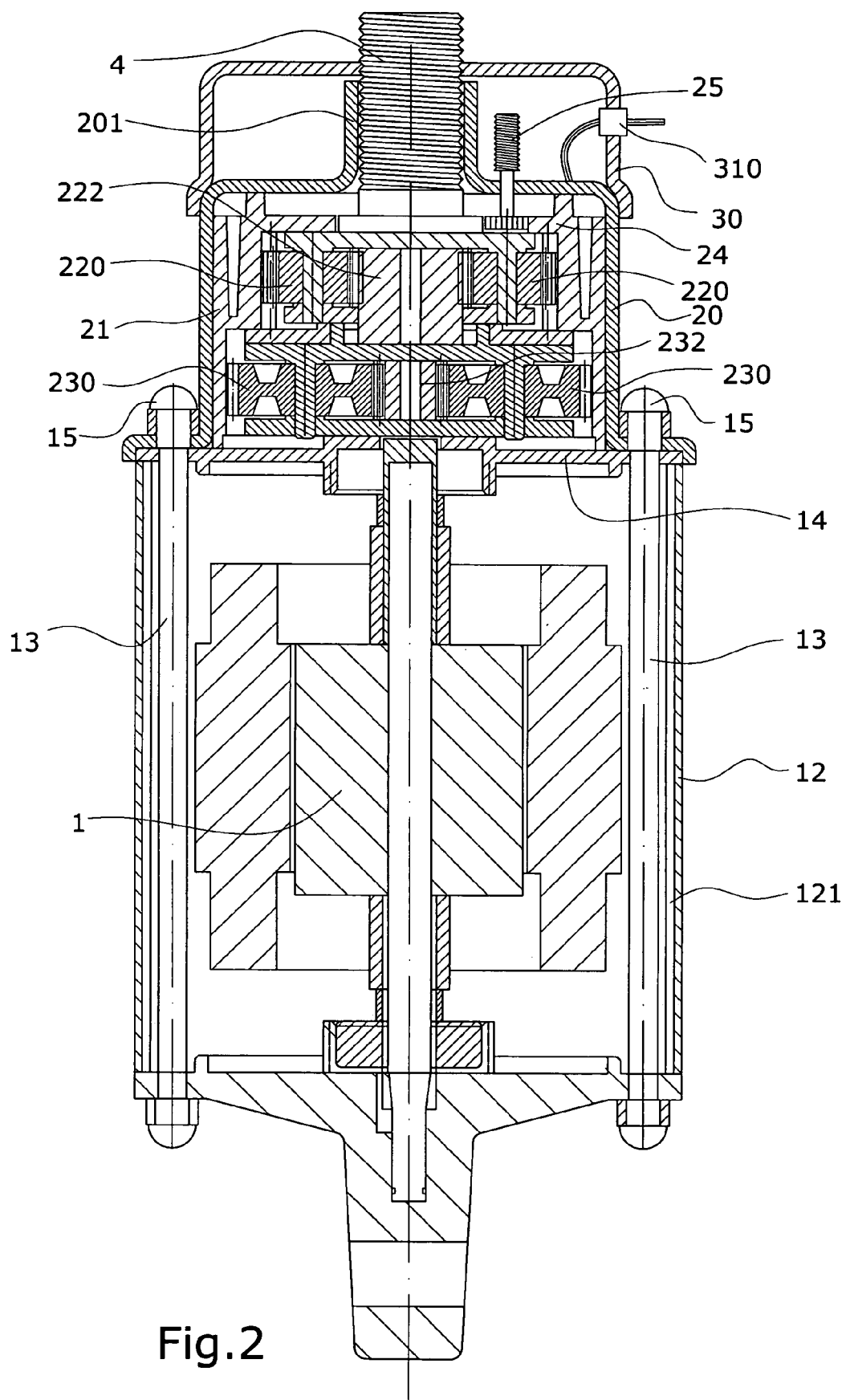

FIG. 2 the cross-sectional perspective view of the present invention.

Figure 3:
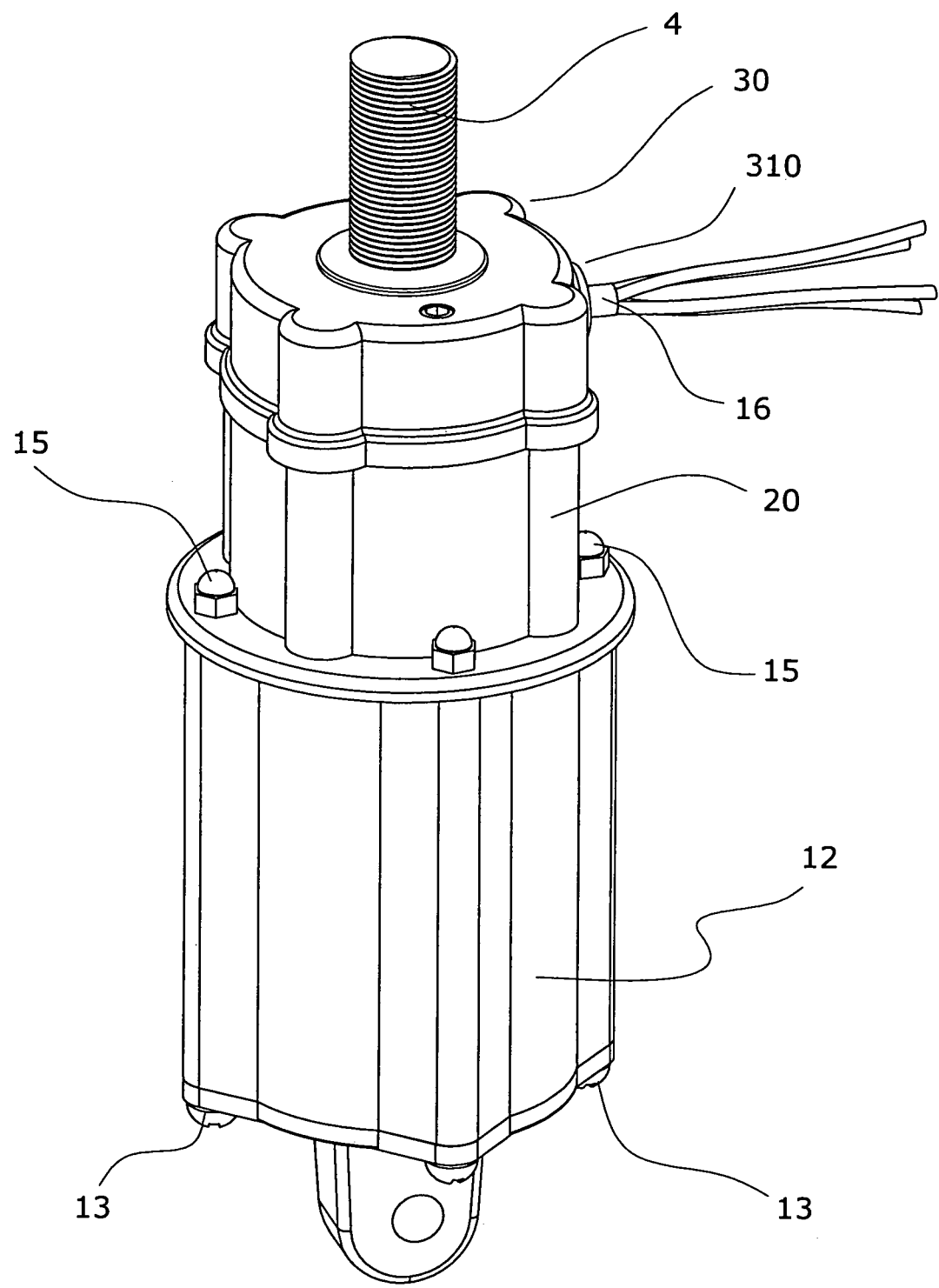

FIG. 3 the consolidated perspective view of the present invention.

FIG. 4 the side cross-sectional view of the conventional linear actuator.

FIG. 5 the front cross-sectional view of the conventional linear actuator.

| | | | |
|---|---|---|---|
| 1 | motor body | 4 | threaded pole |
| 11 | output shaft | 12 | motor case |
| 13 | long bolt | 14 | motor top cover |
| 15 | threaded nut | 16 | power cords |
| 20 | gear case | 21 | ring gear |
| 22 | top planetary gear train | 23 | bottom planetary gear train |
| 24 | side gear | 25 | side threaded pole |
| 30 | top cover | 31 | power cord hole |
| 121 | bolt groove | 201 | gear case hole |
| 223 | bearing gear | 301 | top cover hole |
| 310 | casing | | |
| 220,230 | planetary gear | | |
| 221,231 | small gear bearing | | |
| 222,232 | sun gear | | |

What is claimed is:

1. A device of improvement on the structure of linear actuator, primarily includes a motor body, and motor case, wherein the improvement is characterized as follows:

In the inner side of motor body arranged four bolt grooves and four long bolts inserted into the grooves, and at one end of motor body fitted with motor cover, and gear case as well as nuts outside of the motor cover. The four nuts opposite to each bolt fasten with bolt respectively to lock motor cover and gear case firmly outside of motor case at one end;

In the inner side of gear case arranged with a ring gear, a top planetary gear train, and a bottom planetary gear train; at the top center of the gear case sets up a gear case hole; and within the inner of the top planetary gear train and bottom gear train fitted at least two planetary gears, on top of which arranged a small gear bearing, and a sun gear set up among the planetary gears respectively, the sun gear of bottom planetary gear train mounted on top of the output shaft, wherein the sun gear of top planetary gear mounted on top of the small gear bearing of bottom planetary gear train. At the top of small gear bearing of top planetary gear train fixes a bearing gear, a top cover fitted outside of gear case.

A top cover hole arranges in the center of top cover, a threaded pole insert through the inner side of gear case hole as well as top cover hole, the bottom end of the threaded pole connected with bearing gear, on one edge of the top cover arranged a power cord hole;

At one side of bearing gear set up a side gear with a side threaded pole on top of the side gear;

At the inner side of power cord hole fixes a stationary casing to hold a plurality of extended power cords.

* * * * *